(12) United States Patent
Jones

(10) Patent No.: US 7,217,045 B2
(45) Date of Patent: May 15, 2007

(54) CONNECT/DISCONNECT MECHANISM FOR A SURVEILLANCE CAMERA HEAD

(75) Inventor: Theodore L Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 11/028,011

(22) Filed: Jan. 3, 2005

(65) Prior Publication Data

US 2006/0147194 A1    Jul. 6, 2006

(51) Int. Cl.
*G03B 17/02*    (2006.01)
*H04N 5/225*    (2006.01)

(52) U.S. Cl. ...................... 396/427; 348/373

(58) Field of Classification Search ............... 396/419, 396/427, 428; 348/143, 373–376; 206/316.2
See application file for complete search history.

(56) References Cited

U.S. PATENT DOCUMENTS

| | | | |
|---|---|---|---|
| 4,945,367 A | 7/1990 | Blackshear | 354/81 |
| 5,111,288 A | 5/1992 | Blackshear | 358/108 |
| 5,649,255 A | 7/1997 | Schieltz | 396/427 |
| 5,973,857 A | 10/1999 | Kaneda | 359/701 |
| 6,093,044 A | 7/2000 | Arbuckle | 439/354 |
| 6,141,158 A | 10/2000 | Kaneda | 359/696 |
| 6,234,691 B1 | 5/2001 | Jones et al. | 396/427 |
| 6,268,882 B1 | 7/2001 | Elberbaum | 348/151 |
| 6,354,749 B1 | 3/2002 | Pfaffenberger, II | 396/427 |
| 6,476,978 B2 | 11/2002 | Takahashi | 359/704 |
| 6,634,804 B1 | 10/2003 | Toste et al. | 396/427 |
| 6,700,620 B1 | 3/2004 | Arnold et al. | 348/373 |

FOREIGN PATENT DOCUMENTS

| | | |
|---|---|---|
| EP | 1036383 A | 12/1999 |
| GB | 2363023 A | 12/2001 |

*Primary Examiner*—W. B. Perkey
*Assistant Examiner*—Rishi S. Suthar
(74) *Attorney, Agent, or Firm*—Baker & Daniels LLP (57) ABSTRACT

A surveillance camera assembly includes a mounting apparatus that is attachable to a mounting surface. A camera head assembly is secured to the mounting apparatus by moving the camera head assembly toward the mounting apparatus in a direction along an axis, and rotating the camera head assembly about the axis. The camera head assembly includes a camera head base for engaging the mounting apparatus. A camera head is coupled to the camera head base. The camera head is rotationally locked to the camera head base when the camera head base engages the mounting apparatus, and is rotatable relative to the camera head base after the camera head assembly has been rotated about the axis.

27 Claims, 8 Drawing Sheets

CONNECT/DISCONNECT MECHANISM FOR A SURVEILLANCE CAMERA HEAD

BACKGROUND OF THE INVENTION

1. Field of the Invention

The present invention relates to dome-style surveillance camera systems and, more particularly, to dome-style surveillance camera systems that include quick connect/disconnect mechanisms such that the camera system can be quickly installed onto, or removed from, a mounting surface such as a ceiling, wall or floor.

2. Description of the Related Art

Surveillance camera systems are commonly used by retail stores, banks, casinos and other organizations to monitor activities within a given area. The cameras are often provided with the capability to pan and tilt in order to acquire images over a wide range of areas. The tilt of the camera generally refers to the pivoting of the camera about a horizontal axis that is parallel to the floor, such that the lens of the camera may tilt between an upwardly pointing position and a downwardly pointing position. The pan of the camera refers to the rotation of the camera about a vertical axis that is perpendicular to the floor, such that the lens may scan from side to side. The cameras may also be able to zoom in order to reduce or enlarge the field of view. Oftentimes, each camera is linked to a dedicated video display unit in a security surveillance room with surveillance personnel monitoring the multiple video display units.

Surveillance cameras may be mounted within a hemispherical covert liner assembly designed to allow the camera within the dome window to view outward and yet inhibit individuals from seeing the exact orientation of the camera. The covert liner may shield the camera from damage, as well as provide the camera assembly with a more aesthetically pleasing appearance as it rotates along with the panning motion of the camera.

Existing pan-tilt surveillance camera head connect/disconnect mechanisms fall into two categories. The first category includes mechanisms inserted with a simple linear motion along the pan axis of the camera head. These mechanisms rely on spring-based latches, the operations of which are difficult to verify. Such spring-based latches are also unreliable.

The second category includes mechanisms employing a bayonet-style engagement between the camera head base and the mounting frame. In addition to a linear insertion motion along the pan axis, a limited rotation around the pan axis is used to effect engagement and installation. Such mechanisms provide superior mechanical security and reliability. A problem, however, is that the installer must be able to access the camera head base to effect the relative rotation, since the more accessible part of the rotating camera head, i.e., the covert liner, rotates freely about the pan axis, and thus cannot be used to transfer torque to the camera head base during installation or removal. In enclosures such as ceiling backboxes, such access to the camera head base may require a special tool.

What is needed in the art is a rotatable surveillance camera assembly that can be quickly installed and removed with the high level of security and reliability provided by bayonet-style engagements, and that does not require a special tool to rotate the camera head base during installation and removal.

SUMMARY OF THE INVENTION

The present invention provides a rotatable surveillance camera assembly, including bayonet-style engagements, in which the camera head can be temporarily locked to the camera head base during installation or removal such that manual rotation of the camera head, e.g., the covert liner, results in rotation of the camera head base. The camera head is automatically unlocked from the camera head base after installation to thereby allow normal panning operation of the camera head.

The invention comprises, in one form thereof, a surveillance camera assembly including a mounting apparatus that is attachable to a mounting surface. A camera head assembly is secured to the mounting apparatus by moving the camera head assembly toward the mounting apparatus in a direction along an axis, and rotating the camera head assembly about the axis. The camera head assembly includes a camera head base for engaging the mounting apparatus. A camera head is coupled to the camera head base. The camera head is rotationally locked to the camera head base when the camera head base engages the mounting apparatus, and is rotatable relative to the camera head base after the camera head assembly has been rotated about the axis.

In another form, the invention comprises a surveillance camera assembly including a mounting apparatus that is attachable to a mounting surface. A camera head assembly is secured to the mounting apparatus via rotation of the camera head assembly from a first position to a second position about a longitudinal axis. The camera head assembly includes a camera head base for engaging the mounting apparatus. The camera head base includes a first rotational locking element. A camera head is coupled to the camera head base. The camera head includes a second rotational locking element. The first and second rotational locking elements are biased together by the mounting apparatus when the camera head assembly is in the first position and substantially throughout the rotation of the camera head assembly. The first and second rotational locking elements are disengaged from each other when the camera head assembly reaches the second position.

In yet another form, the invention comprises a method of arranging a surveillance camera assembly, including providing a mounting apparatus. A camera head assembly is formed by coupling a camera head to a camera head base. The camera head base includes a first locking element. The camera head includes a second locking element. The camera head assembly and the mounting apparatus are pressed together such that the first and second locking elements are biased together by the mounting apparatus, thereby rotationally locking the camera head and the camera head base together. The camera head is gripped and rotated such that both the camera head and the camera head base rotate relative to the mounting apparatus. The first and second locking elements are allowed to disengage from one another when the camera head assembly reaches a predetermined rotational position wherein the camera head assembly is secured to the mounting apparatus.

An advantage of the present invention is that the mechanism includes bayonet-style engagements for superior reliability and mechanical security, and yet does not require a special tool to rotate the camera head base.

Another advantage is that, during installation, the electrical connector of the camera head is automatically aligned and mated with the electrical connector of the mounting frame.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Figure 1:
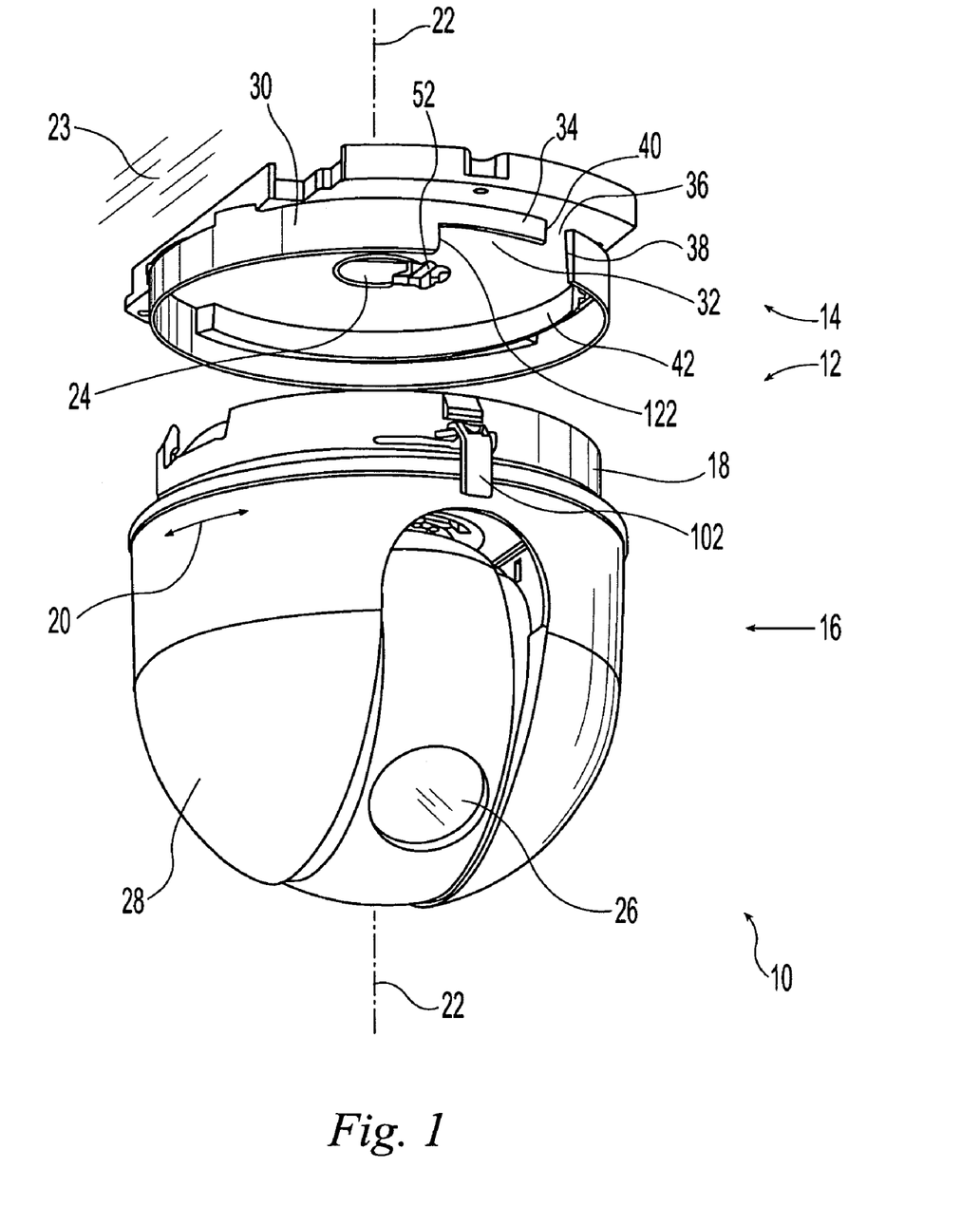
FIG. 1 is a perspective, partially exploded view of one embodiment of a surveillance camera assembly of the present invention.

Referring now to the drawings, and particularly to FIG. 1, there is shown one embodiment of a surveillance camera assembly 10 of the present invention, including a camera head assembly 12 and a mounting apparatus in the form of a mounting frame 14. Camera head assembly 12 includes a camera head 16 coupled to a camera head base 18. More particularly, camera head 16 may be rotatingly attached to camera head base 18 via a circumferential ball bearing (not shown). An inner race of the bearing which is attached to head 16 may be hooked onto an outer race of the bearing which is attached to base 18. Camera head assembly 12 may be fixedly attached to mounting frame 14 such that camera head 16 is rotatable relative to camera head base 18 in directions indicated by double arrow 20 about a pan axis or longitudinal axis 22, while camera head base 18 remains fixed to mounting frame 14. Mounting frame 14 may be attached to a ceiling 23, floor, post, wall, or some other mounting surface, for example.

Mounting frame 14 may include a through channel 24 for carrying wires (not shown) therein. The wires may provide electrical power and control signals from a camera monitoring system (not shown) to a surveillance camera 26 within a covert liner 28 of camera head 16. The wires may also carry signals, including video signals, from camera 26 to the camera monitoring system, which may include a video display unit.

Mounting frame 14 also includes a circumferential wall 30 having a notch 32 exposing a ridge 34. A slot 36 is defined between an end 38 of wall 30 and a distal end 40 of ridge 34. Mounting frame 14 further includes two mating catches 42, only one of which is visible in FIG. 1.

Figure 2:
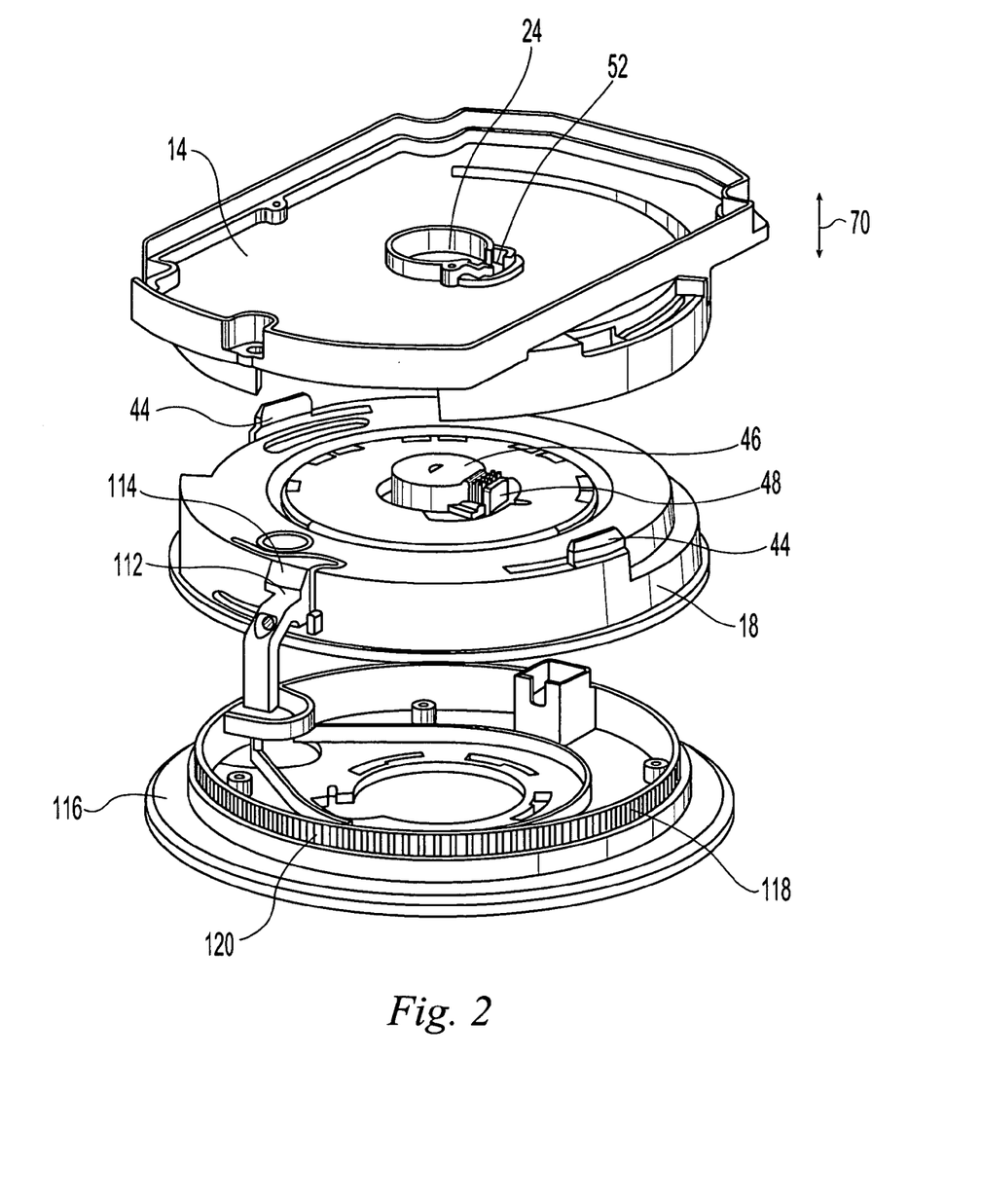
FIG. 2 is an exploded view of the mounting frame, camera head base and pan plate of the surveillance camera assembly of FIG. 1.
Figure 3:
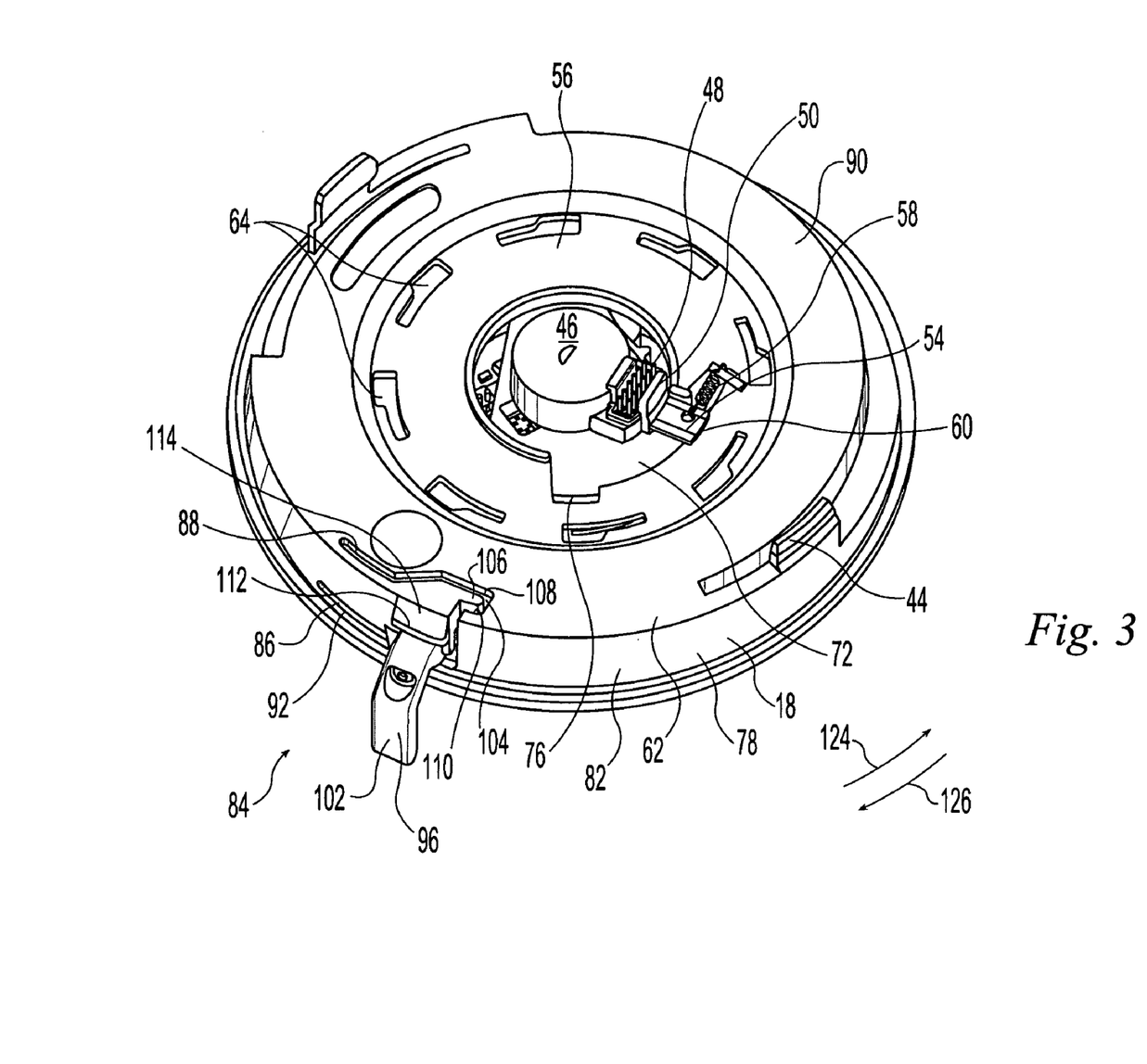
FIG. 3 is a perspective, overhead view of the camera head base of FIG. 2 without the crown plate.

Camera head base 18 includes two bayonet catches 44 (FIG. 2) for matingly latching with catches 42 to thereby secure camera head assembly 12 to mounting frame 14, as discussed in more detail below. Base 18 also includes a slip ring connector, only a cap 46 of which is shown in the drawings. Cap 46 is tapered, thus facilitating cap 46 being received in through channel 24 of mounting frame 14. The slip ring connector enables camera head 16 to rotate freely while still maintaining electrical contact between camera 26 and the wires carried in through channel 24. More particularly, the slip ring has a bottom terminal that is rotatable along with camera head 16, and a fixed upper terminal that is attached to cap 46 and to a twelve pin connector 48 that is best shown in FIG. 3. Connector 48 is matingly connectable to another blind connector (not shown) that may be housed in frame 14 and attached to the wires carried in through channel 24. Frame 14 may locate this connector in a connector pocket. The mounting holes on the printed circuit board on which this blind connector is soldered may be oversized to ensure that the frame's primary registration is to the connector. Bayonet catches 44 may extend beyond connector 48 in an axial direction to thereby protect connector 48 when camera head 16 is being handled before installation.

Connector 48 includes an axial tab 50 that may be received in a recess 52 of channel 24 in mounting frame 14. Recess 52 may be precisely located relative to the connector pocket and may thus ensure proper rotational position of the blind connector received in the connector pocket. Connector 48 also includes a radial tab 54. Tab 54 is connected to a body 56 of camera head base 18 by a spring 58. Further, an end 60 of tab 54 is supported by an upper surface 62 of body 56. Body 56 includes slots 64 for receiving projections 66 (FIG. 4) of a crown plate 68 to thereby secure crown plate 68 to body 56. When crown plate 68 is secured to body 56, radial tab 54 is sandwiched between body 56 and crown plate 68. Thus, radial tab 54 is prevented from moving in axial directions 70 (FIG. 2) parallel to pan axis 22 when connector 48 is connected and disconnected from the connector attached to the wires carried within through channel 24. That is, the sandwiching of radial tab 54 between body 56 and crown plate 68 may prevent potentially damaging torque from being exerted on connector 48 during the connection and disconnection of connector 48 from the other corresponding connector.

In one embodiment, a radially inward section of upper surface 62, generally bounded by slots 64, is recessed in an axial direction 70 below a radially outward section of upper surface 62. This recessed portion of upper surface 62 may receive crown plate 68. Thus, after assembly, an upper surface of crown plate 68 may be substantially coplanar with the radially outward section of upper surface 62.

Figure 4:
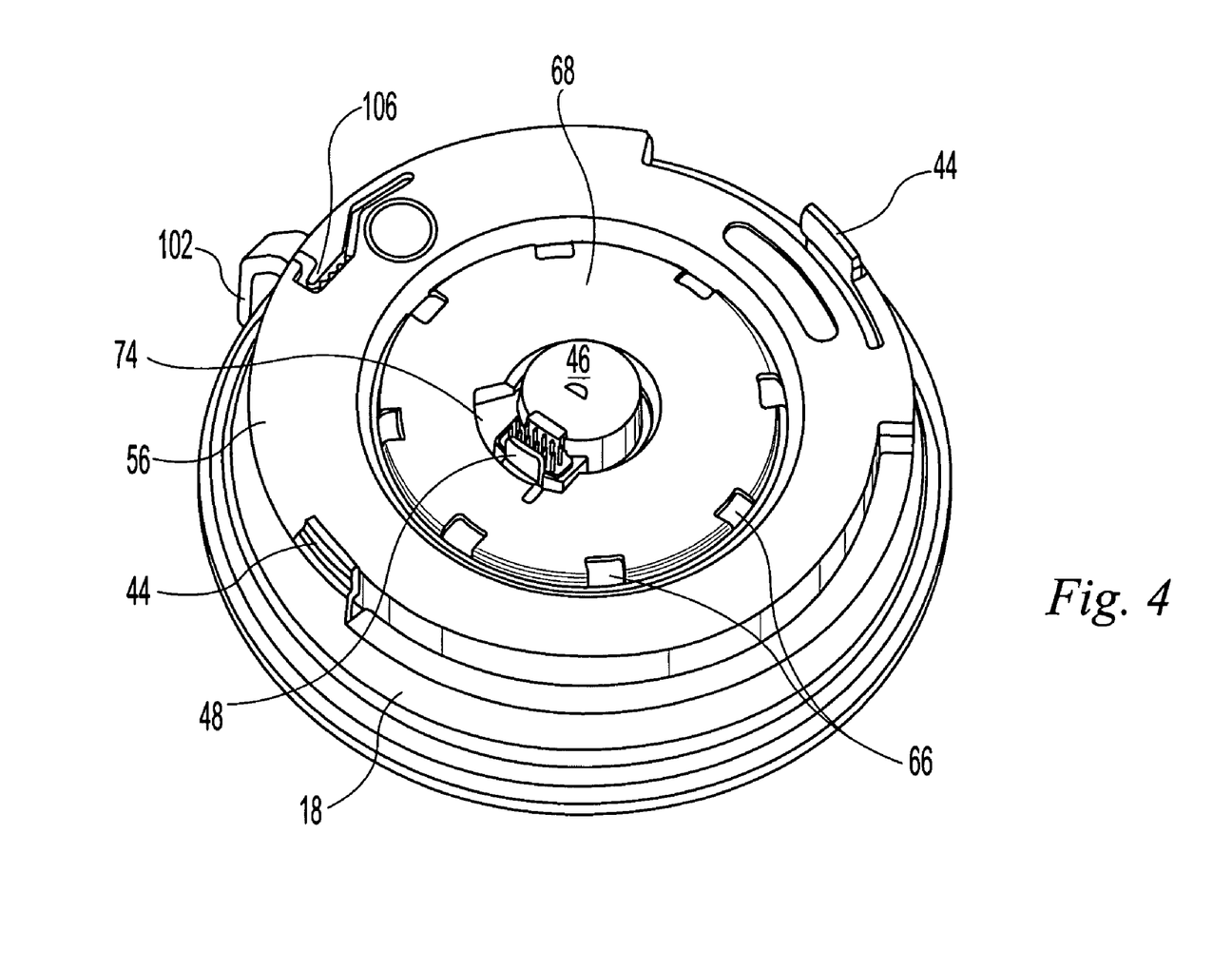
FIG. 4 is a perspective, overhead view of the camera head base of FIG. 2 with the crown plate.

As shown in FIGS. 3 and 4, body 56 and crown plate 68 have respective arcuate cut-outs 72, 74 for receiving connector 48 and allowing body 56 and crown plate 68 to rotate relative to connector 48 and cap 46, as discussed in more detail below. Body 56 also includes a radial slot 76 that is an extension of cut-out 72. During assembly, radial tab 54 may be passed through slot 76 before tab 54 is connected to spring 58.

Advantageously, connector 48 is disposed radially adjacent to slip ring cap 46, i.e., is disposed at approximately the same point along pan axis 22 as cap 46. In contrast, known connectors are displaced in the axial direction from the slip ring, thereby adding to the overall length of the camera assembly in the axial direction.

Body 56 includes a circumferential wall 78 having an inner surface 80 (FIG. 5) and an outer surface 82. Camera head base 18 includes a locking device 84 that may be spring-biased by virtue of a substantially U-shaped throughslot 86 having a first leg 88 in a radially oriented portion 90 of body 56, and a second leg 92 in circumferential wall 78. Locking device 84 includes a rotational locking element in the form of a tooth or rib 94 on inner surface 80. Rib 94 may be oriented parallel to axial directions 70.

Figure 5:
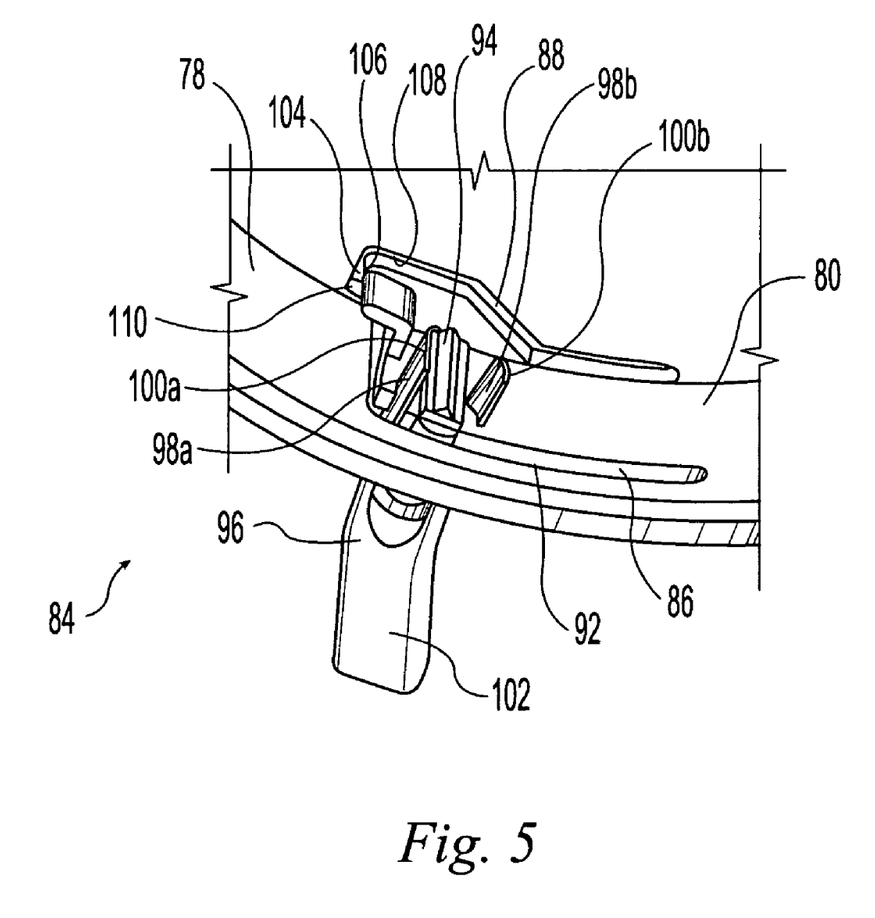
FIG. 5 is a perspective, bottom view of the locking device of the camera head base of FIG. 2.

Extending through circumferential wall 78 is a manual actuator 96 that may be formed of metal for superior strength and durability. Actuator 96 may be insert molded into wall 78, which may be formed of plastic. Manual actuator 96 may have locking elements 98a, 98b extending through wall 78 in a radially inward direction. Locking elements 98a, 98b may have respective ribs 100a, 100b that may extend farther than the remainder of elements 98a, 98b in the radially inward direction. Ribs 100a, 100b may extend in a radially inward direction approximately as far as rib 94 does. Manual actuator 96 includes a handle 102 disposed radially outward of wall 78.

Throughslot 86 includes a smaller U-shaped section 104 within the overall U-shape of throughslot 86. Locking device 84 includes a limit tab 106 defined by section 104 of throughslot 86. The freedom of movement of locking device 84 in the radially inward and radially outward directions may be limited to the width of throughslot 86 in U-shaped section 104. More particularly, the movement of locking device 84 in the radially inward direction may be limited by limit tab 106 engaging a radially inward side 108 of section 104. Similarly, the movement of locking device 84 in the radially outward direction may be limited by limit tab 106 engaging a radially outward side 110 of section 104. Axially displaced from handle 102 is a radially outwardly projecting cam 112 having a tapered surface 114 for engaging ridge 34.

In addition to surveillance camera 26 and covert liner 28, camera head 16 includes a pan plate 116 to which camera 26 and covert liner 28 may be fixedly attached. Pan plate 116 includes slots 118 via which pan plate 116 may be attached to one race of the pan axis ball bearing (not shown). Thus, pan plate 116 may be rotatable relative to camera head base 18. Pan plate 116 includes a circumferential wall 118 having ribs 120 extending parallel to axial directions 70. Ribs 120 may be distributed 360° around wall 118.

Figure 6:
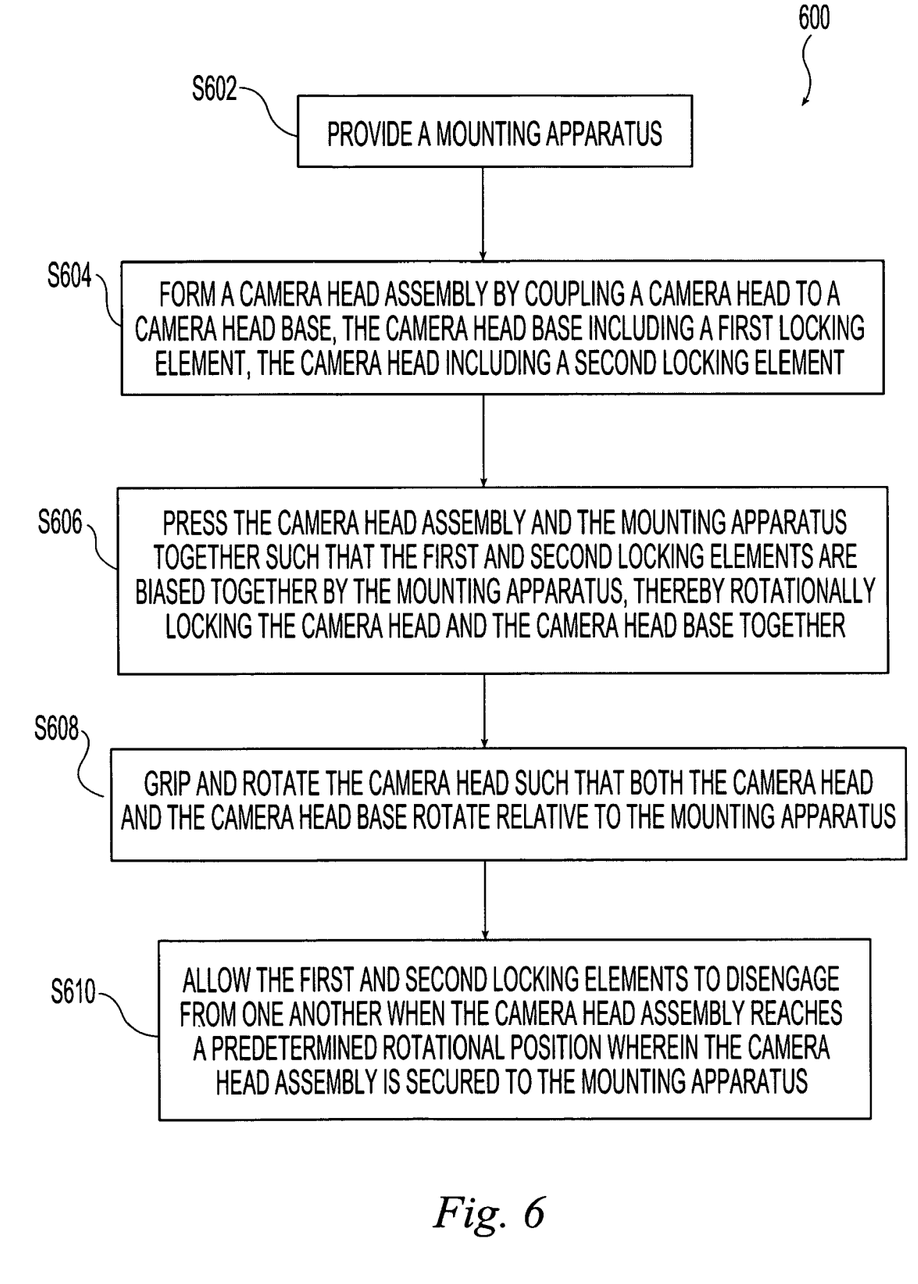
FIG. 6 is a flow chart of one embodiment of a method of the present invention for arranging a surveillance camera assembly.

In general, camera head assembly 12 may be secured to mounting apparatus 14 by moving camera head assembly 12 toward mounting apparatus 14 in an axial direction 70 along pan axis 22, and rotating camera head assembly 12 about axis 22. FIG. 6 illustrates one specific embodiment of a method 600 of the present invention for arranging a surveillance camera assembly. In a first step S602, a mounting apparatus such as mounting frame 14 is provided. In a second step S604, a camera head assembly is formed by coupling a camera head to a camera head base, the camera head base including a first locking element, the camera head including a second locking element. For example, camera head assembly 12 may be assembled by inserting camera head 16 into camera head base 18. Circumferential wall 78 of base 18 may have an inner diameter that is slightly larger than the outer diameter of circumferential wall 118 of pan plate 116 such that first locking element ribs 94, 100a, 100b of base 18 face second locking element ribs 120 of pan plate 116, but do not mesh therewith. Since ribs 120 extend 360° around pan plane 116, camera head 16 may be in any rotational position relative to directions 20 (FIG. 1) when placed into engagement with camera head base 18.

In a third step S606, the camera head assembly and the mounting apparatus are pressed together such that the first and second locking elements are biased together by the mounting apparatus, thereby rotationally locking the camera head and the camera head base together. For example, camera head assembly 12 may be moved toward mounting apparatus 14 in an axial direction 70 such that handle 102 is aligned with the left-hand end of notch, i.e., such that handle 102 is closely adjacent to or is touching side 122 of circumferential wall 30. That is, camera head base 18 may engage mounting frame 14.

As handle 102 is inserted into the left-hand side of notch 32, ridge 34 engages tapered surface 114 of cam 112, tapered cap 46 is guided into channel 24, and bayonet catches 44 engage mounting frame 14. Bayonet catches 44 may lead connector 48 during axial insertion in order to provide accurate rotational orientation therefor. Moreover, axial tab 50 is aligned with recess 52 of mounting frame 14 such that tab 50 is received in recess 52 and male connector 48 is mated with a female connector that is attached to the wires carried in through channel 24. The relative positions of connector 48 and body 56 may be as shown in FIG. 3.

Figure 7:
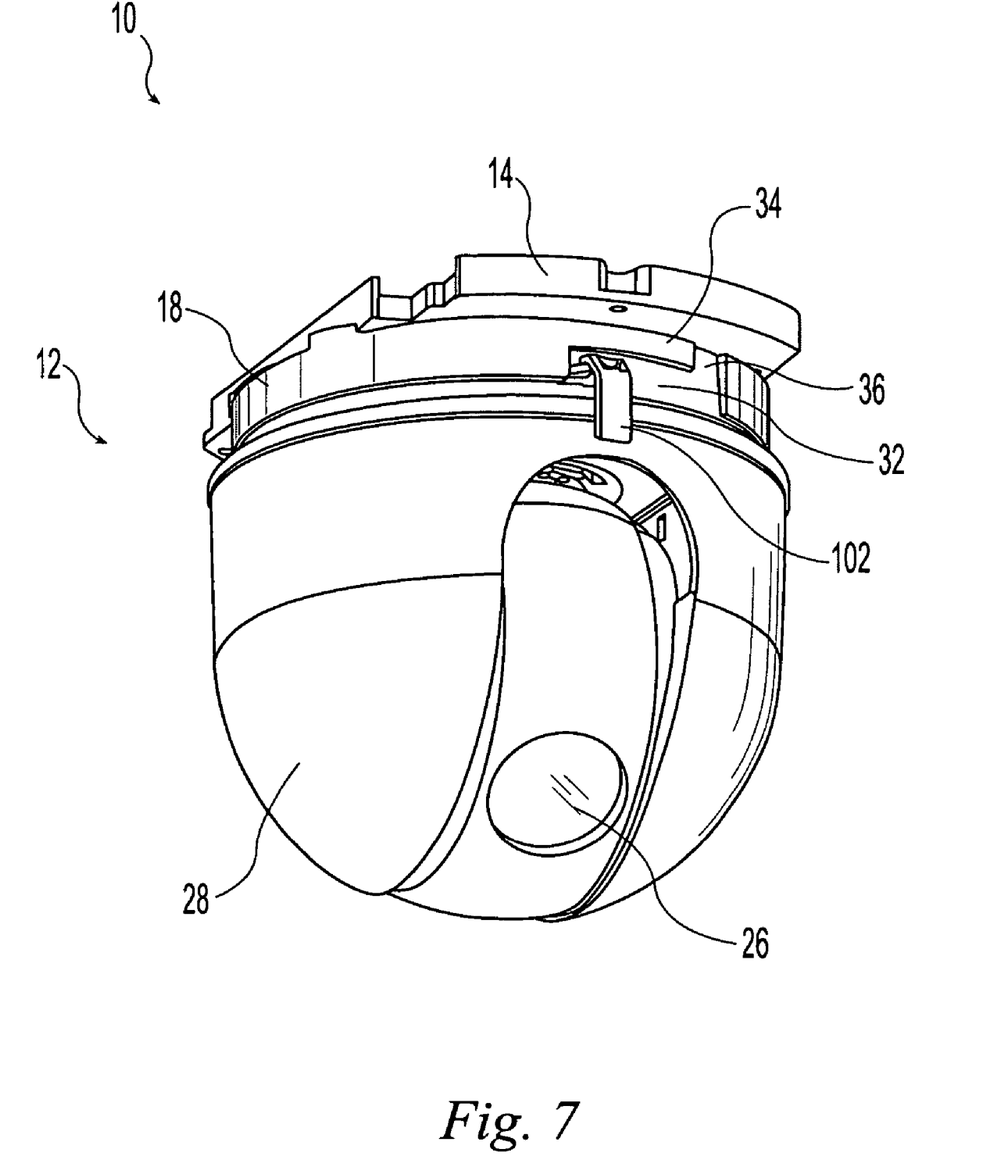
FIG. 7 is a perspective view of the surveillance camera assembly of FIG. 1 after a first step of installation.

As assembly 12 continues movement in the axial direction, cam 112 is pushed farther radially inward by ridge 34 until camera head assembly 12 reaches a first position, as shown in FIG. 7. In addition to cam 112, the remainder of locking device 84, including ribs 94, 100a, 100b, is biased in the radially inward direction by ridge 34. Thus, ridge 34 functions to bias ribs 94, 100a, 100b against ribs 120 to thereby rotationally lock camera head 16 to camera head base 18. The meshing of ribs 94, 100a, 100b with ribs 120 may prevent either of camera head 16 and camera head base 18 from rotating about axis 22 without the other.

Figure 8:
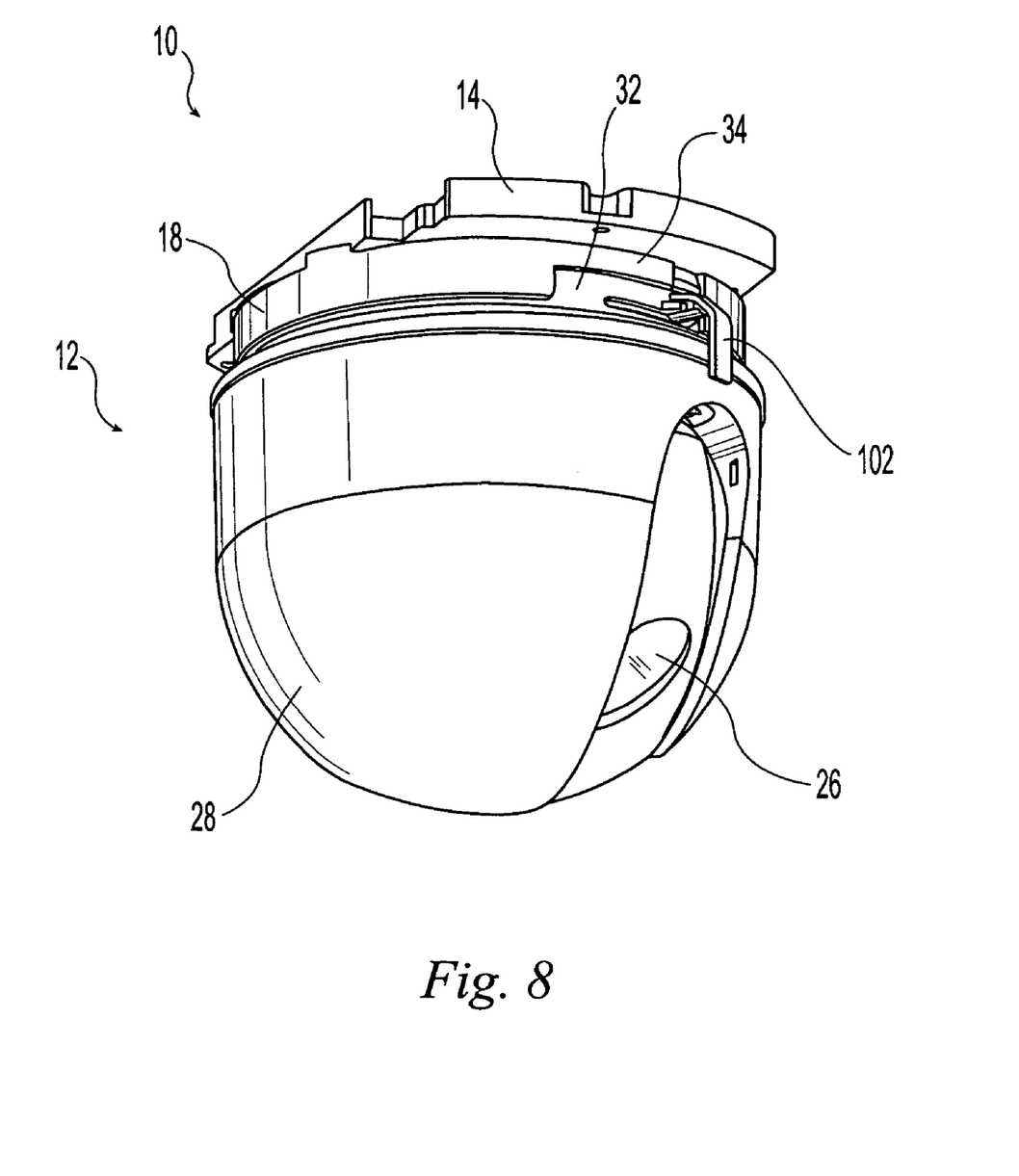
FIG. 8 is a perspective view of the surveillance camera assembly of FIG. 1 after a second step of installation.

In a fourth step S608, the camera head may be gripped and rotated such that both the camera head and the camera head base rotate relative to the mounting apparatus. For example, covert liner 28 may be gripped by a human installer and rotated relative to the fixed mounting frame 14 such that camera head assembly 12 is rotated from the first position shown in FIG. 7 to a second position shown in FIG. 8. Since camera head 16 and camera head base 18 are locked together by locking device 84, camera head base 18 rotates along with covert liner 28 and the rest of camera head 16. Thus, covert liner 28 can be used to transfer torque to camera head base 18.

As camera head assembly 12 rotates relative to mounting frame 14, bayonet catches 44 on camera head base 18 engage and are coupled to mating catches 42 on mounting frame 14. Thus, camera head assembly 12 becomes secured to mounting frame 14 with regard to axial directions 70 and rotational directions 20. Also occurring as camera head assembly 12 rotates relative to mounting frame 14, camera head base 18 rotates in the direction indicated by arrow 124 in FIG. 3 while cap 46, connector 48, axial tab 50 and radial tab 54 remain fixed. Thus, slot 76 moves closer to radial tab 54, and spring 58, having one end attached to body 56 and another end attached to radial tab 54, becomes stretched. Slot 74 of crown plate 68 may be sized to limit rotation of slip ring cap 46 relative to base 18 to the angular bayonet engagement range.

In a fifth step S610, the first and second locking elements are allowed to disengage from one another when the camera head assembly reaches a predetermined rotational position wherein the camera head assembly is secured to the mounting apparatus. For example, when camera head assembly 12 is in the second position shown in FIG. 8, cam 112 has moved entirely past ridge 34 and into slot 36 such that ridge 34 no longer biases cam 112 in a radially inward direction. That is, locking device 84 is no longer biased radially inward. Thus, when camera head assembly 12 is in the second position, ribs 94, 100a, 100b may disengage from ribs 120, and camera head 16 may rotate freely relative to both camera head base 18 and mounting frame 14.

During removal, or uninstallation, the human may push handle 102 radially inward in order to manually bias ribs 94, 100a, 100b and ribs 120 together. While continuing to push inwardly on handle 102, the human may grip covert liner 28 and rotate camera head 16 in a direction 126 opposite to direction 124. Thus, both camera head 16 and camera head base 18 are rotated relative to mounting frame 14 in direction 126. As camera head assembly 12 rotates in direction 126, bayonet catches 44 are decoupled from matching catches 42, thus also decoupling camera head assembly 12 from mounting frame 14. Camera head assembly 12 may then be removed from mounting frame 14, and another camera head assembly may be installed on mounting frame 14 if so desired. After removal, extension spring 58 returns connector 48 to the same consistent position to ensure repeatable blind connections.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera assembly, comprising:
    a mounting apparatus configured to be attached to a mounting surface;
    a camera head assembly configured to be secured to said mounting apparatus by moving said camera head assembly toward said mounting apparatus in a direction along an axis, and rotating said camera head assembly about the axis, said camera head assembly including:
        a camera head base configured to engage said mounting apparatus; and
        a camera head coupled to said camera head base, said camera head being configured to be:
            rotationally locked to said camera head base when said camera head base engages said mounting apparatus; and
            rotatable relative to said camera head base after said camera head assembly has been rotated about the axis.

2. The camera assembly of claim 1 wherein said camera head base is configured to engage said mounting apparatus before said camera head assembly is rotated about the axis.

3. The camera assembly of claim 1 wherein said camera head base includes a bayonet catch configured to engage said mounting apparatus during the rotating of said camera head assembly.

4. The camera assembly of claim 1 wherein said camera head includes a covert liner.

5. The camera assembly of claim 1 wherein said camera head includes a pan plate having a plurality of ribs extending parallel to the axis, said camera head base including a locking element configured to be biased against said ribs when said camera head base engages said mounting apparatus to thereby rotationally lock said camera head to said camera head base.

6. The camera assembly of claim 5 wherein said camera head base includes a radially outwardly projecting cam, said mounting apparatus including a ridge configured to bias said cam in a radially inward direction to thereby rotationally lock said camera head base to said camera head.

7. The camera assembly of claim 6 wherein said camera head is rotatable relative to said camera head base after said cam has been rotated past said ridge.

8. The camera assembly of claim 6 wherein said camera head base includes a manual actuator configured for manually rotationally locking said camera head base to said camera head after said cam has been rotated past said ridge.

9. A surveillance camera assembly, comprising:
    a mounting apparatus configured to be attached to a mounting surface;
    a camera head assembly configured to be secured to said mounting apparatus via rotation of said camera head assembly from a first position to a second position about a longitudinal axis, said camera head assembly including:
        a camera head base configured to engage said mounting apparatus, said camera head base including a first rotational locking element; and
        a camera head coupled to said camera head base, said camera head including a second rotational locking element, wherein said first and second rotational locking elements are biased together by said mounting apparatus when said camera head assembly is in the first position and substantially throughout the rotation of said camera head assembly, and said first and second rotational locking elements are disengaged from each other when said camera head assembly reaches the second position.

10. The camera assembly of claim 9 wherein said camera head base is configured to engage said mounting apparatus before said rotation of said camera head assembly.

11. The camera assembly of claim 9 wherein said camera head base includes a bayonet catch configured to engage said mounting apparatus during the rotation of said camera head assembly.

12. The camera assembly of claim 9 wherein said camera head includes a covert liner.

13. The camera assembly of claim 9 wherein said camera head includes a pan plate, said second rotational locking element comprising a plurality of ribs on said pan plate, said ribs extending parallel to the axis, said first rotational locking element being configured to be biased against said ribs when said camera head base engages said mounting apparatus to thereby rotationally lock said camera head to said camera head base.

14. The camera assembly of claim 13 wherein said camera head base includes a radially outwardly projecting cam, said mounting apparatus including a ridge configured to bias said cam in a radially inward direction to thereby bias said first rotational locking element against said ribs.

15. The camera assembly of claim 14 wherein said camera head is rotatable relative to said camera head base after said cam has been rotated past said ridge.

16. The camera assembly of claim 14 wherein said camera head base includes a manual actuator configured for manually biasing said first rotational locking element against said ribs after said cam has been rotated past said ridge.

17. A method of arranging a surveillance camera assembly, said method comprising:
    providing a mounting apparatus;
    forming a camera head assembly by coupling a camera head to a camera head base, said camera head base including a first locking element, said camera head including a second locking element;

pressing said camera head assembly and said mounting apparatus together such that said first and second locking elements are biased together by said mounting apparatus, thereby rotationally locking said camera head and said camera head base together;

gripping and rotating said camera head such that both said camera head and said camera head base rotate relative to said mounting apparatus; and allowing said first and second locking elements to disengage from one another when said camera head assembly reaches a predetermined rotational position wherein said camera head assembly is secured to said mounting apparatus.

18. The method of claim 17 comprising the further step of attaching said mounting apparatus to a mounting surface.

19. The method of claim 17 wherein said camera head is freely rotatable relative to said camera head base and said mounting apparatus after said allowing step.

20. The method of claim 17 wherein said pressing step includes said camera head base engaging said mounting apparatus before said rotating of said camera head.

21. The method of claim 17 wherein said camera head base includes a bayonet catch, said gripping and rotating step including said bayonet catch engaging said mounting apparatus.

22. The method of claim 17 wherein said camera head includes a covert liner, said gripping and rotating step including gripping and rotating said covert liner.

23. The method of claim 17 wherein said camera head includes a pan plate, said second locking element comprising a plurality of ribs on said pan plate, said ribs extending parallel to the axis, said pressing step including biasing said first locking element against said ribs.

24. The method of claim 23 wherein said camera head base includes a radially outwardly projecting cam, said mounting apparatus including a ridge, said pressing step including said ridge biasing said cam in a radially inward direction to thereby bias said first locking element against said ribs.

25. The method of claim 24 comprising the further step of rotating said camera head relative to said camera head base after said camera head assembly has reached said predetermined rotational position, said cam having been rotated past said ridge when said camera head assembly has reached said predetermined rotational position.

26. The method of claim 24 wherein said camera head base includes a manual actuator, said method comprising the further steps of:

using said manual actuator to manually bias said first and second locking elements together after said cam has been rotated past said ridge; and gripping and rotating said camera head in a direction opposite to the direction of rotating of the first gripping and rotating step, the second gripping and rotating step including rotating both said camera head and said camera head base relative to said mounting apparatus, the second gripping and rotating step including decoupling said camera head assembly from said mounting apparatus.

27. The method of claim 17 wherein said gripping and rotating step includes securing said camera head assembly to said mounting apparatus.

* * * * *